(12) United States Patent
Swaminathan

(10) Patent No.: US 12,461,644 B2
(45) Date of Patent: *Nov. 4, 2025

(54) SYSTEM FOR ASSISTING SEARCHES FOR CODES CORRESPONDING TO ITEMS USING DECISION TREES

(71) Applicant: Avalara, Inc., Seattle, WA (US)

(72) Inventor: Manoj Mahalingam Swaminathan, Tamil Nadu (IN)

(73) Assignee: Avalara, Inc., Seattle, WA (US)

(*) Notice: Subject to any disclaimer, the term of this patent is extended or adjusted under 35 U.S.C. 154(b) by 350 days.

This patent is subject to a terminal disclaimer.

(21) Appl. No.: 17/984,918

(22) Filed: Nov. 10, 2022

(65) Prior Publication Data

US 2023/0126131 A1  Apr. 27, 2023

Related U.S. Application Data

(63) Continuation of application No. 17/405,980, filed on Aug. 18, 2021, now Pat. No. 11,531,447.

(30) Foreign Application Priority Data

Jun. 15, 2021  (IN) .............................. 202141026597

(51) Int. Cl.
   G06F 3/0482      (2013.01)
   G06F 3/14        (2006.01)
   G06F 16/245      (2019.01)

(52) U.S. Cl.
   CPC .............. *G06F 3/0482* (2013.01); *G06F 3/14* (2013.01); *G06F 16/245* (2019.01)

(58) Field of Classification Search
   CPC ........ G06F 3/0482; G06F 3/14; G06F 16/245; G06F 16/9024

See application file for complete search history.

(56) References Cited

U.S. PATENT DOCUMENTS

| | | |
|---|---|---|
| 6,462,762 B1 | 10/2002 | Ku et al. |
| 7,203,701 B1 | 4/2007 | Packebush et al. |
| 7,783,536 B2 | 8/2010 | William et al. |
| 7,933,803 B1 | 4/2011 | Nadler et al. |
| 8,620,578 B1 | 12/2013 | Brown et al. |
| 8,725,407 B2 | 5/2014 | Hurley et al. |
| 9,760,915 B2 | 9/2017 | Pavlou et al. |
| 10,445,818 B1 | 10/2019 | Chowdhary |
| 10,572,953 B1 | 2/2020 | Jason et al. |
| 10,769,611 B2 | 9/2020 | Mcneel |

(Continued)

OTHER PUBLICATIONS

"PCT Search Report and Written Opinion, PCT/US2022/033301", Sep. 26, 2022, 17 pages.

(Continued)

*Primary Examiner* — Kc Chen
(74) *Attorney, Agent, or Firm* — Jeremiah J. Baunach; Frontier IP Law PLLC

(57) ABSTRACT

Systems and methods electronically assist a user in searching for codes corresponding to items by using decision trees. Entities are often required to follow specific rules based on classifications, or codes, corresponding to items. The systems and methods described herein allow entities to easily search for and obtain codes corresponding to entities by facilitating navigation through multiple decision trees by navigating from one decision tree to another.

6 Claims, 10 Drawing Sheets

(56) References Cited

U.S. PATENT DOCUMENTS

| | | |
|---|---|---|
| 2002/0138765 A1 | 9/2002 | Fishman et al. |
| 2004/0172347 A1 | 9/2004 | Barthel |
| 2006/0282339 A1 | 12/2006 | Musgrove et al. |
| 2007/0136158 A1 | 6/2007 | Rawlings et al. |
| 2007/0136159 A1 | 6/2007 | Rawlings et al. |
| 2009/0138500 A1* | 5/2009 | Yuan .................... G06F 16/289 |
| 2013/0013471 A1 | 1/2013 | Fishman |
| 2017/0277797 A1 | 9/2017 | Cao |
| 2017/0315687 A1 | 11/2017 | Yoshida |
| 2019/0279746 A1 | 9/2019 | Kohle et al. |
| 2019/0392644 A1 | 12/2019 | Keselman et al. |

OTHER PUBLICATIONS

Plaisant, C., et al., "Spacetree: supporting exploration in large node link tree, design evolution and empirical evaluation", Information Visualization, 2002. INFOVIS 2002. IEEE Symposium on Oct. 28-29, 2002, Piscataway, NJ, .USA, IEEE,, Oct. 28, 2002, pp. 57-64.

* cited by examiner

| | 311 | 312 | 301 |
|---|---|---|---|
| | LEAF_ID | CODE_ID | |
| 320 | LEAF1_ID | ITEM_CODE1_ID | |
| 321 | LEAF2_ID | ITEM_CODE2_ID | |
| 322 | LEAF3_ID | ITEM_CODE3_ID | |
| | ... | ... | |

FIGURE 3A

| | 361 | 362 | 351 |
|---|---|---|---|
| | BRANCH_ID | QUESTION_ID | |
| 370 | BRANCH1_ID | QUESTION1_ID | |
| 371 | BRANCH2_ID | QUESTION1_ID | |
| 372 | BRANCH3_ID | QUESTION1_ID | |
| | ... | ... | |

FIGURE 3B

SYSTEM FOR ASSISTING SEARCHES FOR CODES CORRESPONDING TO ITEMS USING DECISION TREES

TECHNICAL FIELD

The technical field relates to computer networks, and particularly to networked automated systems for assisting searches for codes corresponding to items by using decision trees.

BRIEF SUMMARY

The present description gives instances of computer systems, storage media that may store programs, and methods. Embodiments of the system use multiple stored trees to assist a user to find codes corresponding to items by navigating through and between the stored trees. By navigating from one tree to another, a user is able to obtain codes corresponding to items more quickly and more accurately classify the items without needing to navigate through different trees separately.

In addition, the user is able to assign an item to a group of items, thereby assigning a code associated with the item group to the item, when the item does not belong to an item group or does not have a code which corresponds to it. In various embodiments, the system may obtain a dataset from a user which the system uses to obtain item information and identify one or more trees which may include the item code. This allows the system to help the user spend less time navigating through the trees to obtain the item code. Additionally, the system allows users to navigate multiple trees at the same time, which facilitates finding the correct code for items which may belong to multiple item groups. By lowering the number of trees a user must access to find a code corresponding to an item, the system is able to reduce the amount of resources used in searching for codes corresponding with items.

Therefore, the systems and methods described herein for assisting in searches for codes corresponding to items by using decision trees improves the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to assist users in searching for codes corresponding to items.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 3A is a diagram showing sample aspects of embodiments of the present disclosure involving a table storing leaf node data, which is an improvement in automated computerized systems.

FIG. 3B is a diagram showing sample aspects of embodiments of the present disclosure involving a table storing branch node data, which is an improvement in automated computerized systems.

DETAILED DESCRIPTION

As has been mentioned, the present description is about computer systems, storage media that may store programs, and methods. Embodiments are now described in more detail.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
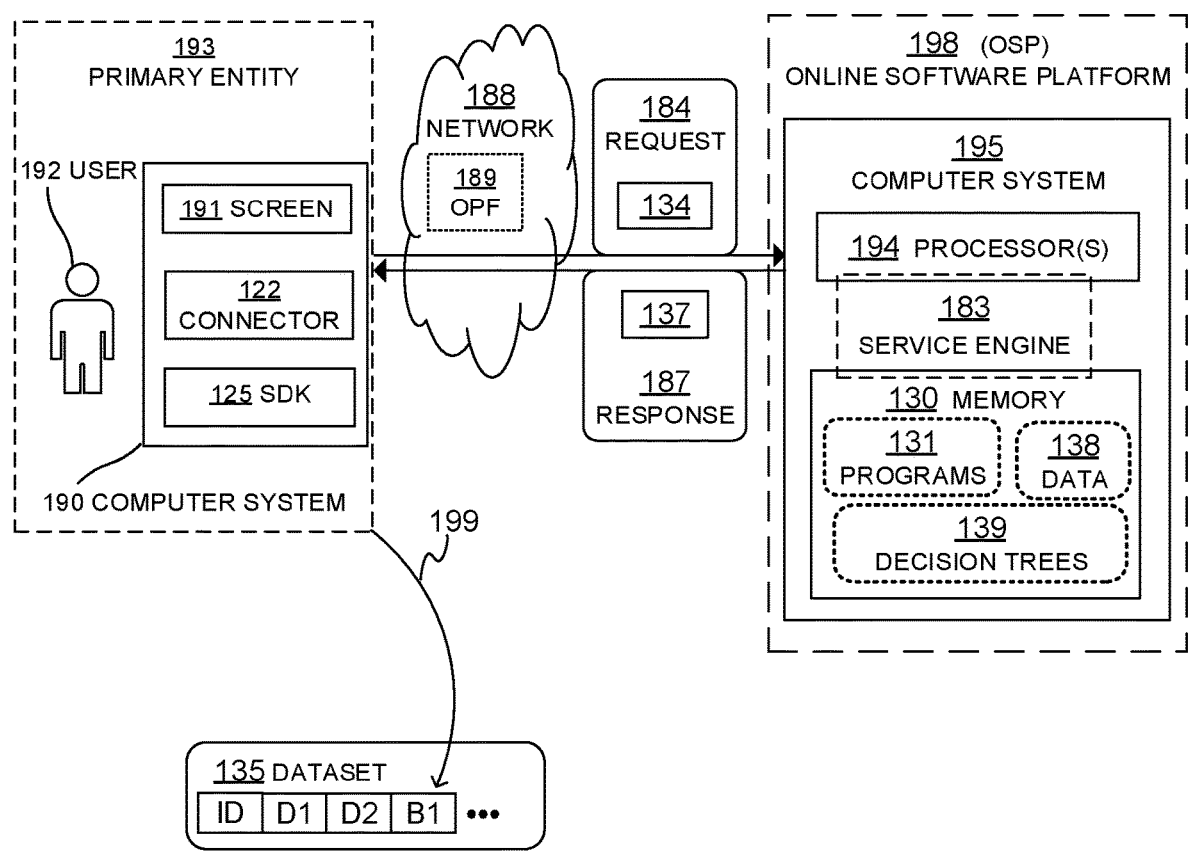
FIG. 1 is diagram showing sample aspects of embodiments of the present disclosure involving obtaining a dataset for an item and using decision trees to obtain a code for the item, which is an improvement in automated computer systems.

FIG. 1 is diagram showing sample aspects of embodiments of the present disclosure involving obtaining a dataset 135 for an item and using decision trees 139 to obtain a code for the item, which is an improvement in automated computer systems.

Included in FIG. 1, a sample computer system 195 according to embodiments is shown. The computer system 195 has one or more processors 194 and a memory 130. The memory 130 stores programs 131, data 138, and a plurality of decision trees 139. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be searches, determinations, computations, verifications, notifications, the transmission of specialized information, including data that effectuates payments, the generation and transmission of documents, the online accessing other systems to effect registrations, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity 193, which can be referred to also merely as entity. In such instances, the user 192 can be an agent of the primary entity 193, and even within a physical site of the primary entity 193, although that is not necessary. In embodiments, the computer system 190 or other device of the user 192 or the primary entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector 122 that is a plugin that sits on top of that certain application. The connector 122 may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules 170 to the payload 134 to determine a requested resource 179, form a payload 137 that is an aspect of the requested resource 179, and then push, send, or otherwise cause to be transmitted a response 187 that carries the payload 137 to the connector. The connector reads the response 187, and forwards the payload 137 to the certain application.

In an alternative such architecture, a device remote to the service engine 183, such as computer system 190, may have a particular application (not shown). In addition, the computer system 195 implements a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the primary entity 193 may have data about one or more secondary entities, for example, via relationship instances with them. The primary entity 193 and/or the secondary entity (not shown) may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 195 receives one or more datasets. A sample received dataset 135 is shown in FIG. 1. The dataset 135 may be received by the computer system 195 in a number of ways. In some embodiments, one or more requests may be received by the computer system 195 via a network. In this example, a request 184 is received by the computer system 195 via the communication network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example, the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the communication network 188, some beyond the control of the user 192 or OSP 198, and some within such control.

The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196, as indicated by arrows 199. (It should be noted that the arrows 199 describe a correspondence, but not the journey of data in becoming the received dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, and so on. The dataset 135 may further have additional such values, as indicated by the horizontal dot-dot-dot to the right of the dataset 135. In some embodiments, the dataset 135 has values that characterize attributes of both the primary entity 193 and the secondary entity (not shown), but that is not required.

In embodiments, stored digital rules (not shown) may be accessed by the computer system 195. These rules are digital in that they are implemented for use by software. For example, these rules may be implemented within programs 131 and data 138. The data portion of these rules may alternately be implemented in memories in other places, which can be accessed via the communication network 188. These rules may be accessed responsive to receiving a dataset, such as the dataset 135. These rules may relate to codes corresponding to items, which are included in the decision trees 139.

In some embodiments, the system stores trees, such as decision trees. In such embodiments, the at least one of the trees includes a root node which is not shared with a root node of another tree. The trees may additionally include branch nodes, of which certain branch nodes of certain trees are coupled with a root node of another tree. Other branch nodes may be coupled to other branch nodes belonging to other trees. Furthermore, in such embodiments, each tree includes at least one leaf node coupled to at least one of the tree's branch node.

In some embodiments, the system receives a dataset for an item, such as the dataset 135, from a primary entity 193. The system may extract parameters from the dataset which comprise at least one item attribute for at least one of the stored trees.

In some embodiments, the system identifies a first tree in the stored trees based on the extracted parameters. The system may remotely cause, through the communication network 188, a screen of a remote computer, such as the computer system 190, to display a first user interface (UI). The first UI may present a selected first branch node which is identified responsive to the item attribute, where the first branch node is coupled with at least one leaf and at least one other branch node of a first tree.

In some embodiments, the system receives selection input indicating another branch node of the first tree from a user, such as the user 192. The system may remotely cause a second UI to be presented which includes a second branch node of a second tree coupled to the first branch node and which is coupled to a second root and at least one second leaf node.

In some embodiments, the system receives a second selection input from the second UI indicating the second branch node. The system may cause the screen to present a third UI to be presented which includes the second branch node, and at least one other branch node coupled with the second branch node, and at least one of the second leaf nodes.

In some embodiments, at least one of the second leaf nodes is additionally coupled with at least one branch node of the first branch nodes. In some embodiments, none of the second leaf nodes are additionally coupled with any branch node of the first branch nodes.

In some embodiments, each leaf node includes information describing a code. The code may indicate a group of items that an item indicated by the dataset belongs to.

In some embodiments, the third UI presents an assign button for a leaf node. The system may determine whether the assign button has been activated by a user. In response to a determination that the assign button has been activated, the system assigns a code indicated by the leaf node to the item, thereby including the item in a group of items identified by the code.

In some embodiments, the system causes the screen of the remote client computer to present a question to the user. The system may obtain input from the user representing an answer to the question. The system may use the input representing an answer to the question as selection input used to select a branch node.

Figure 2:
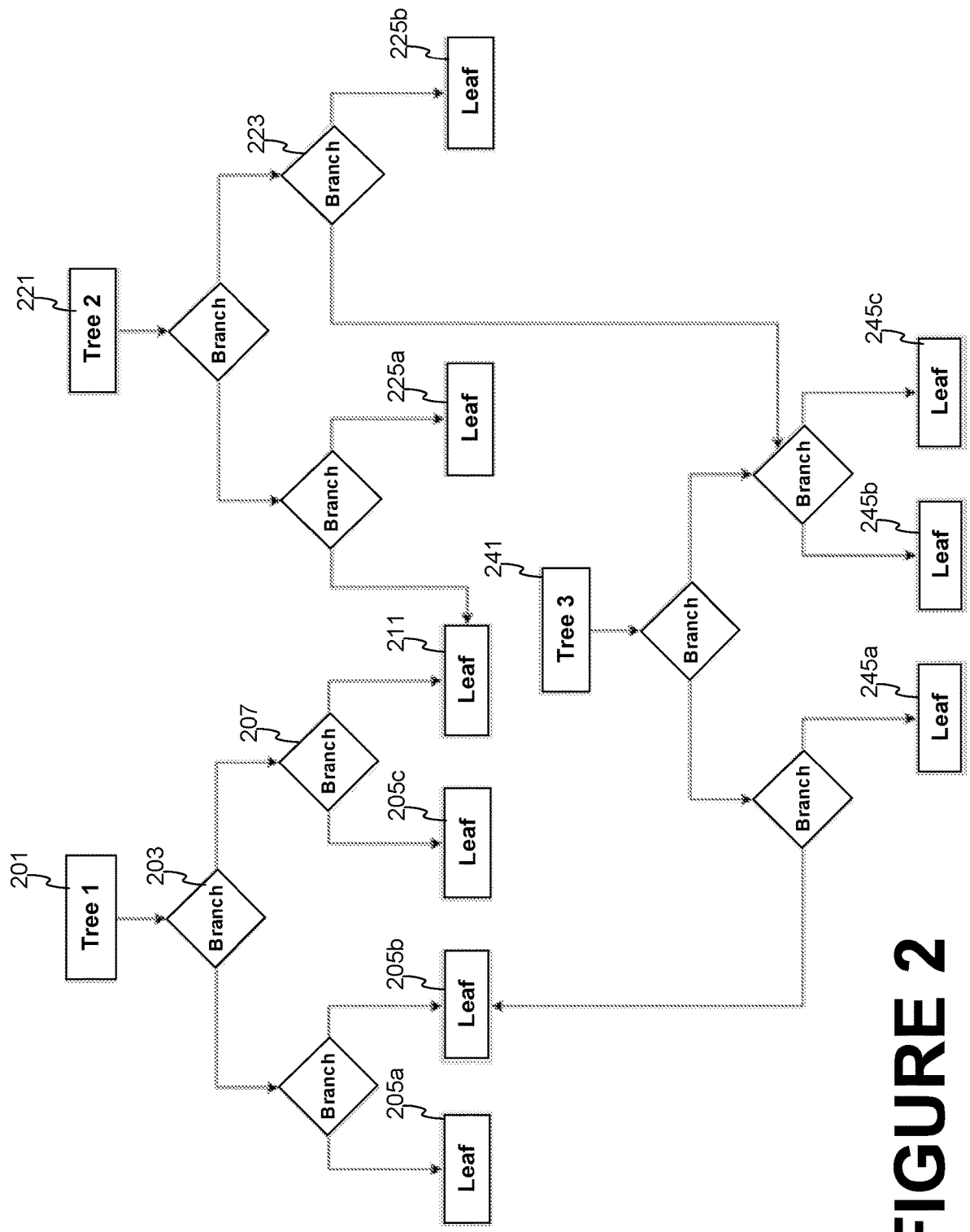
FIG. 2 is a diagram showing sample aspects of embodiments of the present disclosure involving multiple decision trees which is an improvement in automated computerized systems.

FIG. 2 is a diagram showing sample aspects of embodiments of the present disclosure involving multiple decision trees which is an improvement in automated computerized systems. FIG. 2 includes decision tree root 201, decision tree root 221, and decision tree root 241, as well as several branch and leaf nodes for each decision tree. Decision tree root 201 is coupled to one or more branch nodes 203, and, by extension through the branch nodes, other branch nodes, such as branch node 207, and multiple leaf nodes 205*a*-205*c* and 211. Decision tree root 221 is coupled to one or more branch nodes 223, and, by extension through the branch nodes, multiple leaf nodes 211, 225*a*, and 225*b*. Decision tree root 241 is coupled to multiple branch nodes and, by extension through the branch nodes, and multiple leaf nodes 245*a*-245*c*. A decision tree may be identified based on the root node.

A decision tree may have one or more branch nodes, such as branch node 203, that are coupled to the root of the decision tree. A branch node, such as branch node 203, may additionally be coupled to other branch nodes, without being coupled to a leaf node. Additionally, a decision tree may have branch nodes, such as branch node 207, which are coupled only to leaf nodes. A decision tree may also include branch nodes, such as branch node 223, which are coupled to at least one leaf node and at least one branch node. Furthermore, branch nodes may be connected to nodes belonging to other trees, such as branch node 223 being coupled to a branch node belonging to decision tree root 241 as well as leaf node 225*b* which belongs to decision tree root 221. In various embodiments, a branch node may be coupled to any number of branch nodes, leaf nodes, or root nodes, which each may belong to one or more different trees.

A decision tree may additionally have one or more leaf nodes, such as leaf node 205*a*, 205*c*, 225*a*, 225*b*, and 245*a*-245*c*, which are coupled to a branch node which belongs to a single root node. Furthermore, a leaf node may be coupled to multiple branch nodes, such as leaf nodes 211 and 205*b*. Such a leaf node may be coupled to multiple branch nodes of the same tree (not shown), or multiple branch nodes belonging to multiple trees, as illustrated by leaf nodes 211 and 205*b*. Furthermore, a leaf node may be coupled to a root node (not shown).

Thus, by using decision trees similar to the trees depicted in FIG. 2, a user may navigate between and through multiple trees by using the interconnected branch nodes.

FIG. 3A is a diagram showing sample aspects of embodiments of the present disclosure involving a table 301 storing leaf node data, which is an improvement in automated computerized systems. The table 301 includes a leaf id column 311 and a code id column 312. The leaf id column 311 stores identifiers, one for each of a plurality of leaf nodes that are included in the decision trees 139. The code id column 312 stores an identifier for an item code for which corresponds to a group of items indicated by the leaf. Each of the rows 320-322 of the table 301 includes sample data indicating a leaf node and an item code corresponding to the leaf node. The table 301 may include additional data, as indicated by the horizontal dot-dot-dots in the final rows of the leaf id column 311 and code id column 312.

FIG. 3B is a diagram showing sample aspects of embodiments of the present disclosure involving a table 351 storing branch node data, which is an improvement in automated computerized systems. The table 351 includes a branch id column 361 and a question id column 362. The branch id column 361 stores identifiers, one for each of a plurality of branch nodes that are included in the decision trees 139. The question id column 362 stores an identifier for a question presented to a user at the corresponding branch. Each of the rows 370-372 of the table 351 includes sample data indicating a branch node and a question corresponding to the branch node. The table 351 may include additional data as indicated by the horizontal dot-dot-dots in the final rows of the branch id column 361 and question id column 362.

Figure 4:
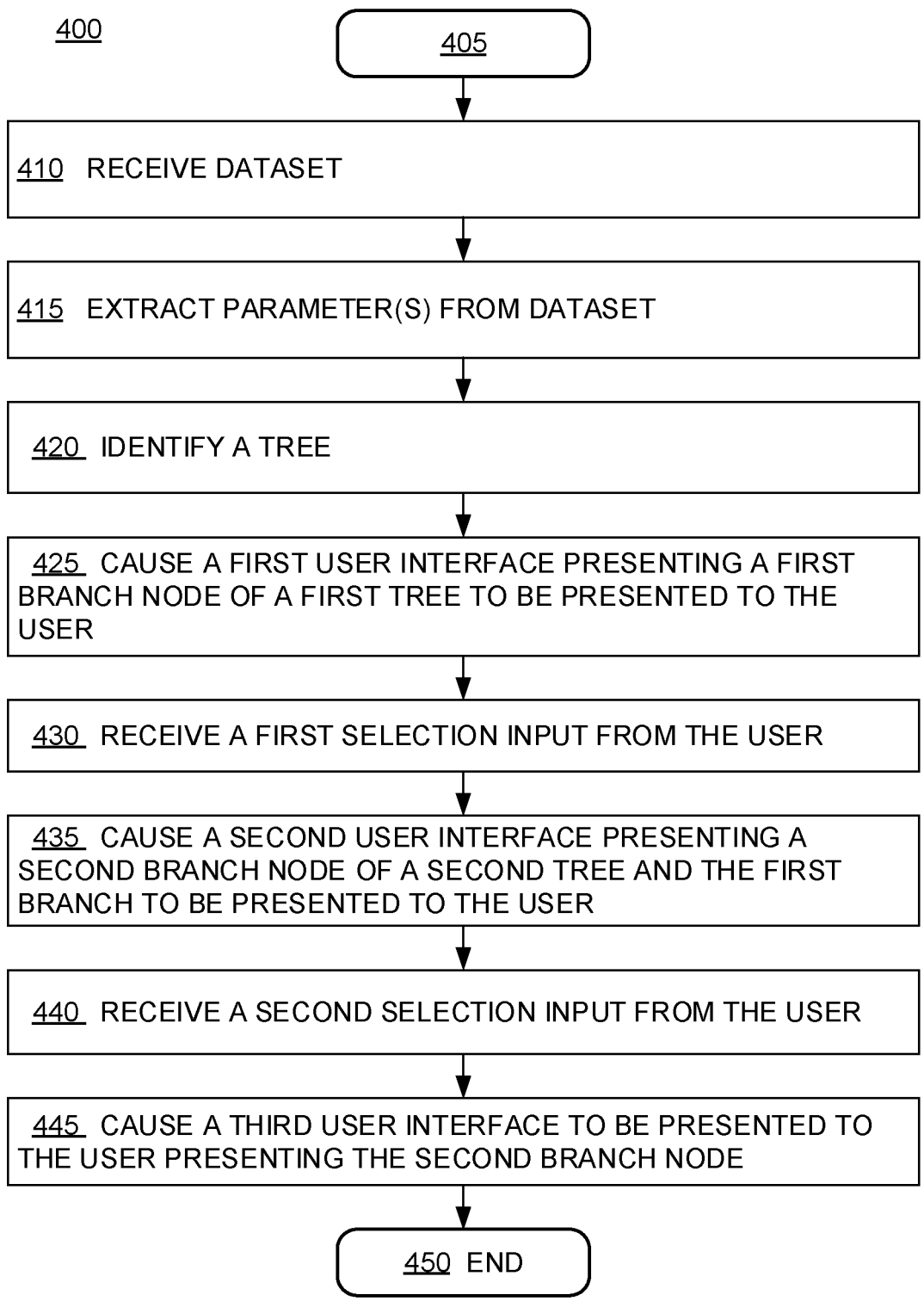
FIG. 4 is a flowchart for illustrating a sample method for assisting a user in searching for a code corresponding to an item by using decision trees, according to embodiments of the present disclosure.

FIG. 4 is a flowchart for illustrating a sample method 400 for assisting a user in searching for a code corresponding to an item by using decision trees, according to embodiments of the present disclosure.

Figure 5:
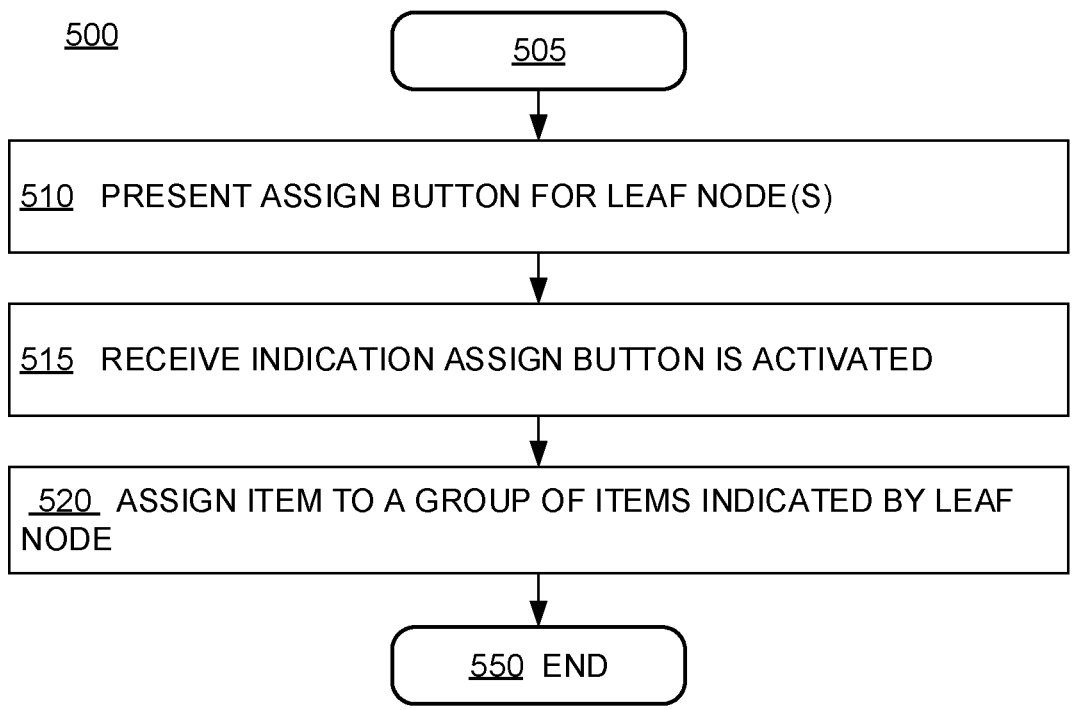
FIG. 5 is a flowchart for illustrating a sample method for assigning a code indicated by a leaf node to an item that is an improvement in automated computerized systems, according to embodiments of the present disclosure.
Figure 6:
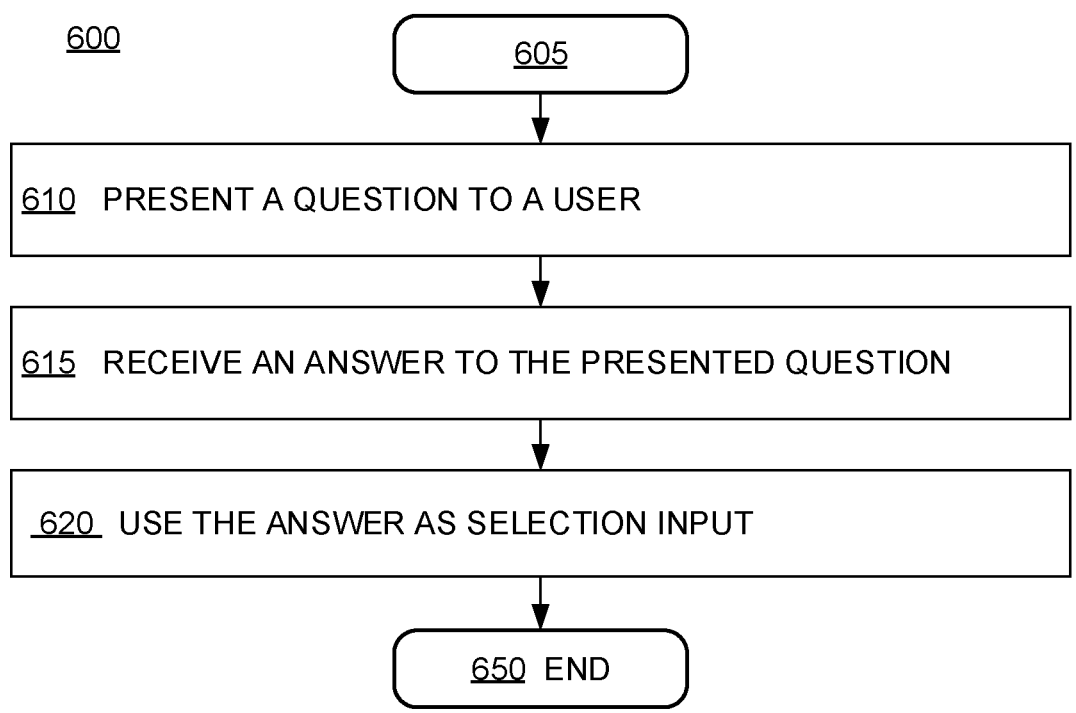
FIG. 6 is a flowchart for illustrating a sample method for obtaining selection input from a user that is an improvement in automated computerized systems, according to embodiments of the present disclosure.

Although, in the present example, the operations and methods described with reference to the flowcharts illustrated in FIGS. 4-6 are described as being performed by the OSP 198, in various embodiments, one or more of the operations and methods described with reference to the flowcharts illustrated in FIGS. 6-8 may be performed by the client computer system 190.

The method 400 starts at 405.

At 410, the OSP 198 receives a dataset from a primary entity 193 which includes parameters.

At 415, the OSP 198 extracts parameters from the dataset which comprise at least one item attribute for at least one of the decision trees 139.

At 420, the OSP 198 identifies a first tree of the decision trees 139, which has at least one root node and at least one branch node.

At 425, the OSP 198 causes a user interface presenting a first branch node of the first tree to be presented to a user, such as the user 192. The first branch node may be identified responsive to the item attribute. The first branch node may be coupled with other branch nodes belonging to the first tree. The first branch node, the other branch nodes, or both, may be coupled to one or more leaf nodes. The UI may present options for selecting one of the other branch nodes to a user. In some embodiments, the OSP 198 remotely causes the user interface to be presented to the user via a network, such as the communication network 188.

At 430, the OSP 198 receives a first selection input from a user. The first selection input may identify at least one of the presented branch nodes.

At 435, the OSP 198 causes a second user interface presenting the branch node identified by the selection input. The selected branch node may be coupled to at least some branch nodes belonging to the first tree. The selected branch node may be coupled to at least one leaf node belonging to the first tree. The selected branch node may be coupled to a second branch node of a second tree which has a second root node distinct from the root node of the first tree, and as well as one or more second leaf nodes. The second user interface may be presented to a user in a similar manner as the first user interface.

At 440, the OSP 198 receives a second selection input from a user. The second selection input may identify at least one of the branch nodes presented in the second user interface.

At 445, the OSP 198 causes a third user interface presenting the branch node identified by the second selection input to be presented to a user. The third user interface may present second selected branch node, at least one additional branch node belonging to the second tree, and at least one of the second leaf nodes belonging to the second tree The method ends at 450.

FIG. 5 is a flowchart for illustrating a sample method 500 for assigning a code indicated by a leaf node to an item that is an improvement in automated computerized systems, according to embodiments of the present disclosure.

The method starts at 505.

At 510, the OSP 198 causes a user interface, such as the first user interface, second user interface, or third user interface, to present an assign button for at least one leaf node to a user.

At 515, the OSP 198 receives an indication that the assign button is activated.

At 520, the OSP 198 assigns a code indicated by the leaf node to the item indicated by the received dataset. In some embodiments, the code indicated by the leaf node corresponds to a group of items.

The method ends at 550.

FIG. 6 is a flowchart for illustrating a sample method 600 for obtaining selection input from a user that is an improvement in automated computerized systems, according to embodiments of the present disclosure.

The method starts at 605.

At 610, the OSP 198 causes a question to be presented to a user. The OSP 198 may cause the question to be presented to the user by causing a remote computer, such as the computer system 190, to present the question to the user. The question may be a prompt to select a certain branch of a decision tree. The question may be a prompt requesting additional information about the item.

At 615, the OSP 198 receives an answer to the presented question from the user.

At 620, the OSP 198 uses the answer as selection input. The answer may include additional information about the item, which the OSP 198 uses to determine which branch nodes to display to the user. For example, the OSP 198 may determine, based on the answer to the question, that the item does not belong to a particular class of items. Thus, the OSP 198 would be able to determine that a branch node which leads to a leaf node that corresponds to that class of items should not be presented to the user.

The method ends at 650.

Figure 7:
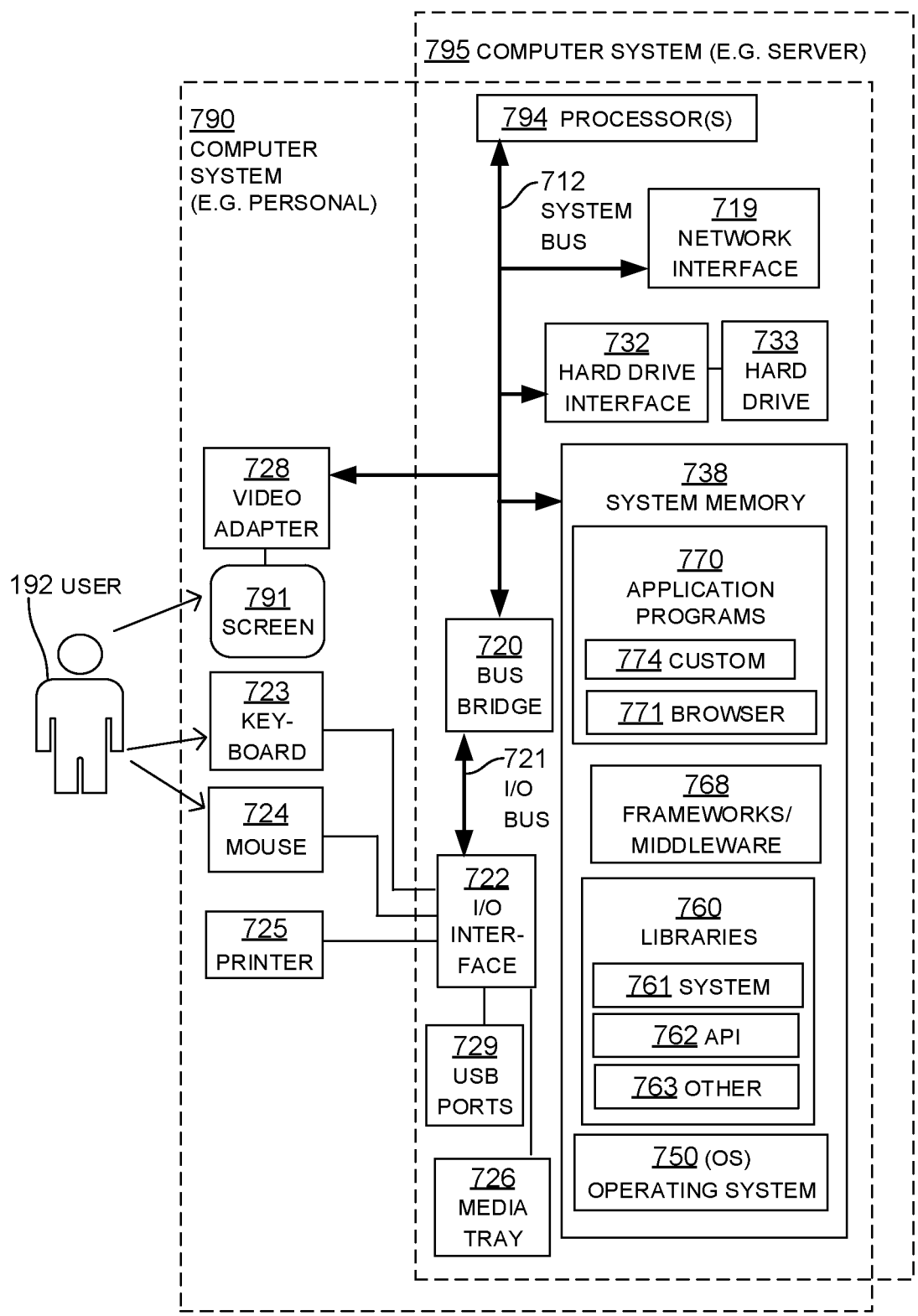
FIG. 7 shows details for a sample computer system and for a sample computer system.

FIG. 7 shows details for a sample computer system 795 and for a sample computer system 790. The computer system 795 may be a server, while the computer system 790 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of OPF 189.

The computer system 795 and the computer system 790 have similarities, which FIG. 7 exploits for purposes of economy in this document. It will be understood, however, that a component in the computer system 795 may be implemented differently than the same component in the computer system 790. For instance, a memory in a server may be larger than a memory in a personal computer, and so on. Similarly, custom application programs 774 that implement embodiments may be different, and so on.

The computer system 795 includes one or more processors 794. The processor(s) 794 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 794 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores."

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 795, or the computer system 790, are not intended to be exhaustive. Rather, they are representative, for highlighting essential components that can be used with embodiments.

The computer system 795 also includes a system bus 712 that is coupled to the processor(s) 794. The system bus 712 can be used by the processor(s) 794 to control and/or communicate with other components of the computer system 795.

The computer system 795 additionally includes a network interface 719 that is coupled to system bus 712. Network interface 719 can be used to access a communications network, such as the communication network 188. Network interface 719 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 795 also includes various memory components. These memory components include memory components shown separately in the computer system 795, plus cache memory within the processor(s) 794. Accordingly, these memory components are examples of non-transitory machine-readable media. The memory components shown separately in the computer system 795 are variously coupled, directly or indirectly, with the processor(s) 794. The coupling in this example is via the system bus 712.

Instructions for performing any of the methods or functions described in this document may be stored, completely or partially, within the memory components of the computer system 795, etc. Therefore, one or more of these non-transitory computer-readable media can be configured to store instructions which, when executed by one or more processors 794 of a host computer system such as the computer system 795 or the computer system 790, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 795 include a non-volatile hard drive 733. The computer system 795 further includes a hard drive interface 732 that is coupled to the hard drive 733 and to the system bus 712.

The memory components of the computer system 795 include a system memory 738. The system memory 738 includes volatile memory including, but not limited to, cache memory, registers and buffers. In embodiments, data from the hard drive 733 populates registers of the volatile memory of the system memory 738.

In some embodiments, the system memory 738 has a software architecture that uses a stack of layers, with each layer providing a particular functionality. In this example, the layers include, starting from the bottom, an Operating System (OS) 750, libraries 760, frameworks/middleware 768 and application programs 770, which are also known as applications 770. Other software architectures may include less, more or different layers. For example, a presentation layer may also be included. For another example, some mobile or special purpose operating systems may not provide a frameworks/middleware 768.

The OS 750 may manage hardware resources and provide common services. The libraries 760 provide a common infrastructure that is used by the applications 770 and/or other components and/or layers. The libraries 760 provide functionality that allows other software components to perform tasks more easily than if they interfaced directly with the specific underlying functionality of the OS 750. The libraries 760 may include system libraries 761, such as a C standard library. The system libraries 761 may provide functions such as memory allocation functions, string manipulation functions, mathematical functions, and the like.

In addition, the libraries 760 may include API libraries 762 and other libraries 763. The API libraries 762 may include media libraries, such as libraries to support presentation and manipulation of various media formats such as MPREG4, H.264, MP3, AAC, AMR, JPG, and PNG. The API libraries 762 may also include graphics libraries, for instance an OpenGL framework that may be used to render 2D and 3D in a graphic content on the screen 791. The API libraries 762 may further include database libraries, for instance SQLite, which may support various relational database functions. The API libraries 762 may additionally include web libraries, for instance WebKit, which may support web browsing functionality, and also libraries for applications 770.

The frameworks/middleware 768 may provide a higher-level common infrastructure that may be used by the applications 770 and/or other software components/modules. For example, the frameworks/middleware 768 may provide various Graphic User Interface (GUI) functions, high-level resource management, high-level location services, and so forth. The frameworks/middleware 768 may provide a broad spectrum of other APIs that may be used by the applications 770 and/or other software components/modules, some of which may be specific to the OS 750 or to a platform.

The application programs 770 are also known more simply as applications and apps. One such app is a browser 771, which is a software that can permit the user 192 to access other devices in the internet, for example, while using a Graphic User Interface (GUI). The browser 771 includes program modules and instructions that enable the computer system 795 to exchange network messages with a network, for example, using Hypertext Transfer Protocol (HTTP) messaging.

The application programs 770 may include one or more custom applications 774, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 770 may include a contacts application, a book reader application, a location application, a media application, a messaging application, and so on. Applications 770 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 770 may use built-in functions of the OS 750, of the libraries 760, and of the frameworks/middleware 768 to create user interfaces for the user 192 to interact with.

The computer system 795 moreover includes a bus bridge 720 coupled to the system bus 712. The computer system 795 furthermore includes an input/output (I/O) bus 721 coupled to the bus bridge 720. The computer system 795 also includes an I/O interface 722 coupled to the I/O bus 721.

For being accessed, the computer system 795 also includes one or more Universal Serial Bus (USB) ports 729. These can be coupled to the I/O interface 722. The computer system 795 further includes a media tray 726, which may include storage devices such as CD-ROM drives, multimedia interfaces, and so on.

The computer system 790 may include many components similar to those of the computer system 795, as seen in FIG. 7. In addition, a number of the application programs may be more suitable for the computer system 790 than for the computer system 795.

The computer system 790 further includes peripheral input/output (I/O) devices for being accessed by a user more routinely. As such, the computer system 790 includes a screen 791 and a video adapter 728 to drive and/or support the screen 791. The video adapter 728 is coupled to the system bus 712.

The computer system 790 also includes a keyboard 723, a mouse 724, and a printer 725. In this example, the keyboard 723, the mouse 724, and the printer 725 are directly coupled to the I/O interface 722. Sometimes this coupling is via the USB ports 729.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 794.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all of these aspects have even similar reference numerals.)

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

Figure 8:
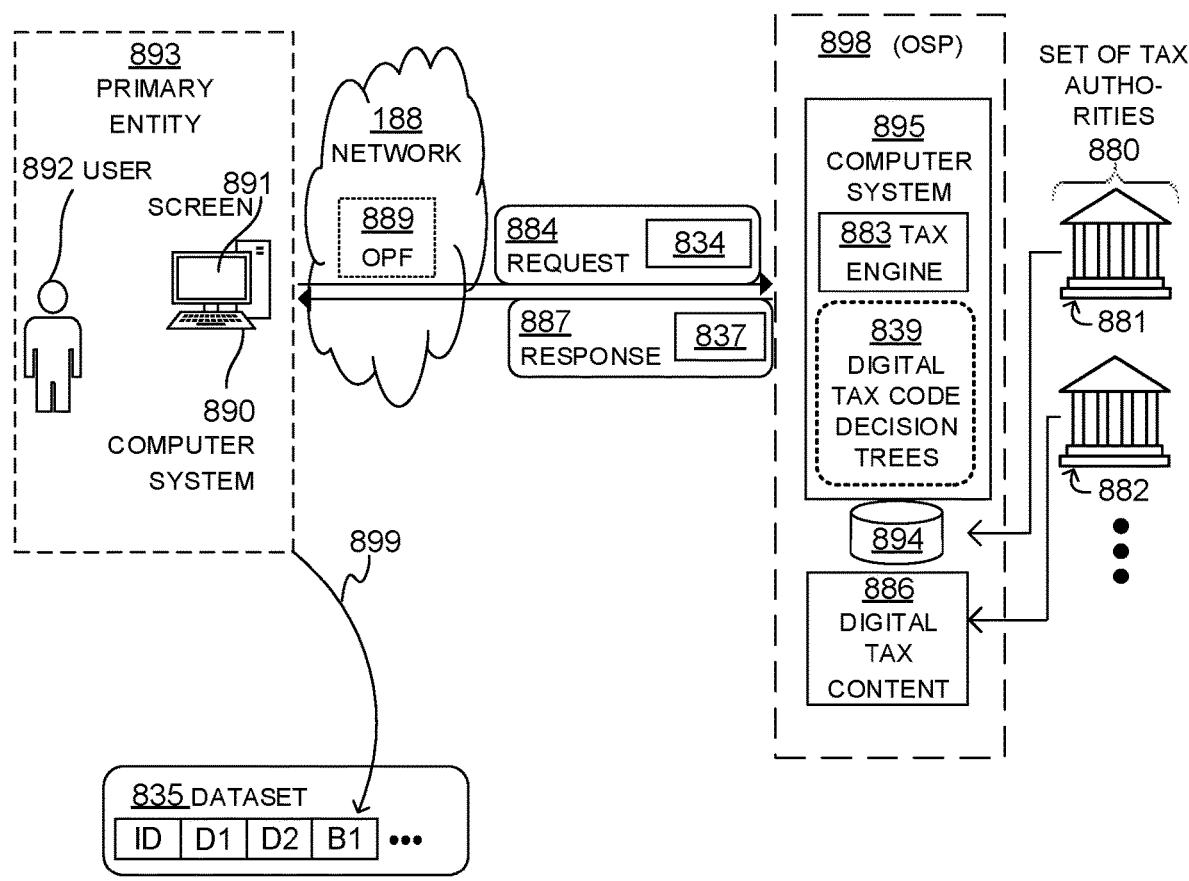
FIG. 8 is diagram for an operational example and use case where the code corresponding to the item is a digital tax code for the item identified by the dataset.

FIG. 8 is diagram for an operational example and use case where the code corresponding to the item is a digital tax code for the item identified by the dataset 835. The item may be an item involved in a relationship instance entered into between a primary entity 893 and a secondary entity (not shown).

It will be recognized that aspects of FIG. 8 have similarities with aspects of FIG. 1. Portions of such aspects may be implemented as described for analogous aspects of FIG. 1. A computer system 895 is shown, which is used to help customers, such as a user 892, with tax compliance. Further in this example, the computer system 895 is part of an OSP 898 that is implemented as a Software as a Service (SaaS) provider, for being accessed by the user 892 online. Alternately, the functionality of the computer system 895 may be provided locally to a user.

The user 892 may be standalone. The user 892 may use a computer system 890 that has a screen 891. In embodiments, the user 892 and the computer system 890 are considered part of the primary entity 893, which is also known as entity 893. The primary entity 893 can be a business, such as a seller of items, a reseller, a buyer, and so on. In such instances, the user 892 can be an employee, a contractor, or otherwise an agent of the entity 893. In use cases the entity 893 is a seller, a secondary entity is a buyer, and together they are performing the buy-sell transaction. The buy-sell transaction may involve an operation, such as an exchange of data to form an agreement. This operation can be performed in person, or over the communication network 188, etc. In such cases the entity 893 can even be an online seller, but that is not necessary. The transaction will have data that is known to the entity 893, similarly with what was described by the relationship instance.

In a number of instances, the user 892 and/or the entity 893 use software applications to manage their business activities, such as sales, resource management, production, inventory management, delivery, billing, and so on. The user 892 and/or the entity 893 may further use accounting applications to manage purchase orders, sales invoices, refunds, payroll, accounts payable, accounts receivable, and so on. Such software applications, and more, may be used locally by the user 892, or from an Online Processing Facility (OPF) 889 that has been engaged for this purpose by the user 892 and/or the entity 893. In such use cases, the OPF 889 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018, selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Lastly, even where a seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations, the computer system 895 may be specialized for tax compliance. The computer system 895 may have one or more processors and memory, for example, as was described for the computer system 195 of FIG. 1. The computer system 895 thus implements a tax engine 883 to make the determinations of tax obligations. The tax engine 883 can be as described for the service engine 183.

The computer system 895 may further store locally entity data, i.e., data of user 892 and/or of entity 893, either of which/whom may be a customer, and/or a seller or a buyer in a sales transaction. The entity data may include profile data of the customer, and transaction data from which a determination of a tax obligation is desired. In the online implementation of FIG. 8, the OSP 898 has a database 894 for storing the entity data. This entity data may be inputted by the user 892, and/or caused to be downloaded or uploading by the user 892 from the computer system 890 or from the OPF 889, or extracted from the computer system 890 or from OPF 889, and so on. In other implementations, a simpler memory configuration may suffice for storing the entity data.

The computer system 895 may also store digital tax code decision trees 839, which can be used to search for tax codes corresponding to specific items. In some embodiments, the decision trees are represented as domain specific languages (DSLs). In such embodiments, the OSP 198 may use the DSL to build a graph entity of the trees, create user interfaces based on the trees, etc. An example of a DSL representing a decision tree for a salad is provided below:

```
tree:
  name: Salads
  decision:
    name: is_store_prepared
    question: "Is this salad store prepared?"
    options:
      name: "Yes"
      condition:
        data: "isStorePrepared"
        value: true
        expr: ==
      decision:
        name: is_hand_dipped_or_scooped
        question: "Is it a hand dipped or scooped salad?"
        options:
          name: "Yes"
          condition:
            data: "isHandDippedOrScooped"
            value: true
            expr: ==
          result: "PF160014"
         —name: "No"
          condition:
            data: "isHandDippedOrScooped"
            value: false
            expr: ==
          decision:
            name: salad_type
            question: "What type of salad is it?"
            options:
              name: "Fruit Salad"
```

```
condition:
  data: "saladType"
  value: Fruit Salad
  expr: ==
  result: "PF160051"
name: "Green salad containing protein, top-
pings, dressing, etc."
condition:
  data: "saladType"
  value: Green salad containing protein, toppings,
  dressing, etc.
  expr: ==
  result: "PF160053"
name: "No"
condition:
  data: "isStorePrepared"
  value: false
  expr: ==
decision:
  name: in_original_packaging
  question: "Is this salad sold in the original
  manufacturer packaging?"
  options:
    name: "Yes"
    condition:
      data: "inOriginalPackaging"
      value: true
      expr: ==
    decision:
      name: salad_Type
      question: "What type of salad is it?"
      options:
        name: "Green salad containing protein, top-
        pings, dressing, etc."
        condition:
          data: "saladType"
          value: Green salad containing protein, toppings,
          dressing, etc.
          expr: ==
          result: "PF160054"
        name: "Fruit salad or dessert parfait containing
        fruit"
        condition:
          data: "saladType"
          value: Fruit salad or dessert parfait containing
          fruit
          expr: ==
          result: "PF160052"
        name: "Deli/grain/pasta salad"
        condition:
          data: "saladType"
          value: Deli/grain/pasta salad
          expr: ==
          result: "PF160017"
    name: "No"
    condition:
      data: "inOriginalPackaging"
      value: false
      expr: ==
      result: "PF160050"
```

In some embodiments, the decision trees are automatically updated when digital tax content, such as digital tax content 886, is obtained by the OSP 898. In some embodiments, the decision trees are manually updated when digital tax content is obtained by the OSP 898.

A digital tax content 886 is further implemented within the OSP 898. The digital tax content 886 can be a utility that stores digital tax rules (not shown) for use by the tax engine 883. As part of managing the digital tax content 886, there may be continuous updates of the digital tax rules, by inputs gleaned from a set 880 of different tax authorities 881, 882, . . . . Updating may be performed by humans, or by computers, and so on. As mentioned above, the number of the different tax authorities in the set 880 may be very large.

For a specific determination of a tax obligation, the computer system 895 may receive one or more datasets. A sample received dataset 835 is shown in FIG. 8, which can be similar to what was described for the dataset 135 of FIG. 1. In this example, the computer system 890 transmits a request 884 that includes a payload 834, and the dataset 835 is received by the computer system 895 parsing the received payload 834. In this example, the single payload 834 encodes the entire dataset 835, but that is not required, as mentioned earlier. The response 887 is sent by the OSP 898, and contains response data 837 which may include instructions to present a specific user interface, such as those described in FIGS. 9-12, a digital tax code, or digital tax codes, corresponding to the item described in the dataset 835, and other data related to the digital tax code and item which may be used by the primary entity 893 or OSP 898.

In this example, the dataset 835 has been received because it is desired to determine a tax code for an item. As such, the sample received dataset 835 has values that characterize attributes of the item, and is generated by the primary entity 893, as indicated by an arrow 899. (It should be noted that the arrow 899 describes a correspondence, but not the journey of the data of the item in becoming the received dataset 835.) Accordingly, in this example, the sample received dataset 835 has a value ID for an identity of the dataset 835 and/or a transaction between entities. The dataset 835 also has a value PE for the name of the primary entity 893 or the user 892, which can be the seller making sales transactions, some online. The dataset 835 further has a value PD for relevant data of the primary entity 893 or the user 892, such as an address, place(s) of business, prior nexus determinations with various tax jurisdictions, and so on. The dataset 835 has a value B2 for the sale price of the item sold. The dataset 835 may further have additional values, as indicated by the dot-dot-dot in the dataset 835. These values may characterize further attributes, such as what item was sold, for example, by a Stock Keeping Unit (SKU), how many units of the item were sold, a date and possibly also time of the transaction, and so on.

FIGS. 9-12 display sample views of User Interfaces (UIs). Each of the UIs displayed in FIGS. 9-12 may be presented on the screen 191 of the computer system 190. The SDK 125 and connector 122 may be used to present the UIs, as well as to communicate any input received from the UIs to the OSP 198. The UIs may be used by the primary entity 193 to search for codes corresponding to items.

Figure 9:
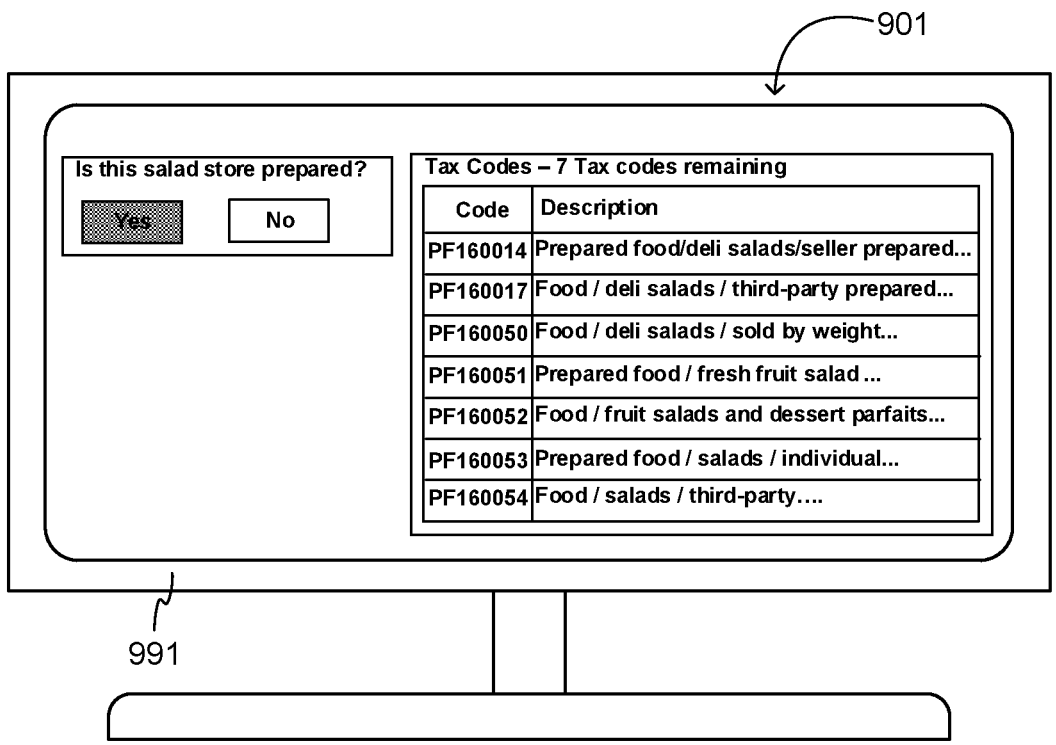
FIG. 9 is a sample view of a UI of a system for assisting searches for item codes corresponding to items that is an improvement in automated computerized systems, according to embodiments of the present disclosure.

FIG. 9 is a sample view of a UI 901 of a system for assisting searches for item codes corresponding to items that is an improvement in automated computerized systems, according to embodiments of the present disclosure.

A primary entity may use the UIs described in FIGS. 9-12 to search for codes corresponding to an item specified by a dataset, such as the dataset 135. The screen 991 displays the UI 901 which is used to provide an interface for a primary entity to search for an item code. The UI 901 displays a question to the primary entity along with one or more selectable user interface elements representing answers to the question. The UI 901 also displays a table of possible codes for the item identified by the OSP 198 based on an obtained dataset. In this example, the question presented by the UI 901 is "is this salad store prepared" and the possible answers are "yes" and "no." A variety of questions may be presented to the user which may have a variety of methods of being answered, such as by having more than two answers, answers other than "yes" and "no," requesting user input, such as by typing an answer, and any other methods of requesting and obtaining information related to the item via user input. After an answer is obtained by the OSP 198 through the UI 901, the UI is altered, changed, replaced, etc., to display another question, any remaining codes for the item, or a code which corresponds to the item based on the information obtained from the user.

Figure 10:
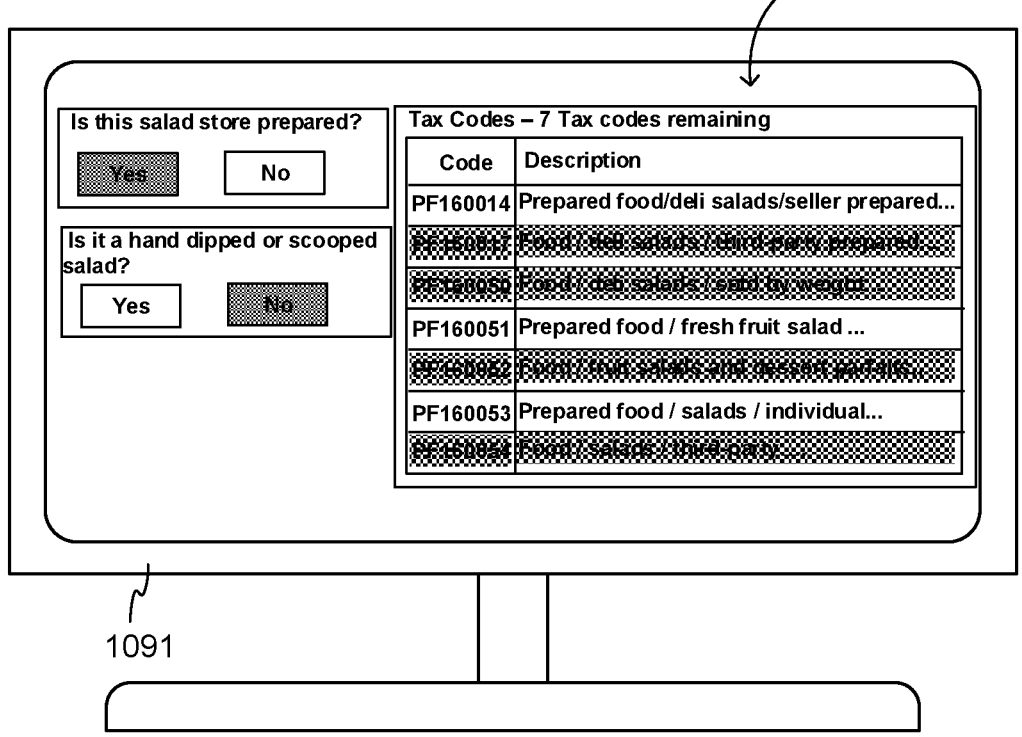
FIG. 10 is a sample view of a UI of a system for assisting searches for item codes corresponding to items that is an improvement in automated computerized systems, according to embodiments of the present disclosure.

FIG. 10 is a sample view of a UI 1001 of a system for assisting searches for item codes corresponding to items that is an improvement in automated computerized systems, according to embodiments of the present disclosure.

The UI 1001 may be displayed by the screen 1091 after an answer for a question presented in another UI, such as UI 901, is obtained. The screen 1091 presents the UI 1001 which includes the user interface elements indicating the question and answer presented in another UI, and presents additional user interface elements with one or more additional questions and answers to the user. The UI 1001 additionally presents an updated table of tax codes which may correspond to the items. In the updated table, the codes which do not apply to the item, determined based on the answers to the questions, are displayed differently than the codes which may apply to the item, to indicate that they do not apply to the item. For example, in the table shown in FIG. 10, the codes which do not apply to the item are obscured, and the codes which may apply to the item are not obscured. In some embodiments, codes which do not apply to the item are not displayed at all.

Figure 11:
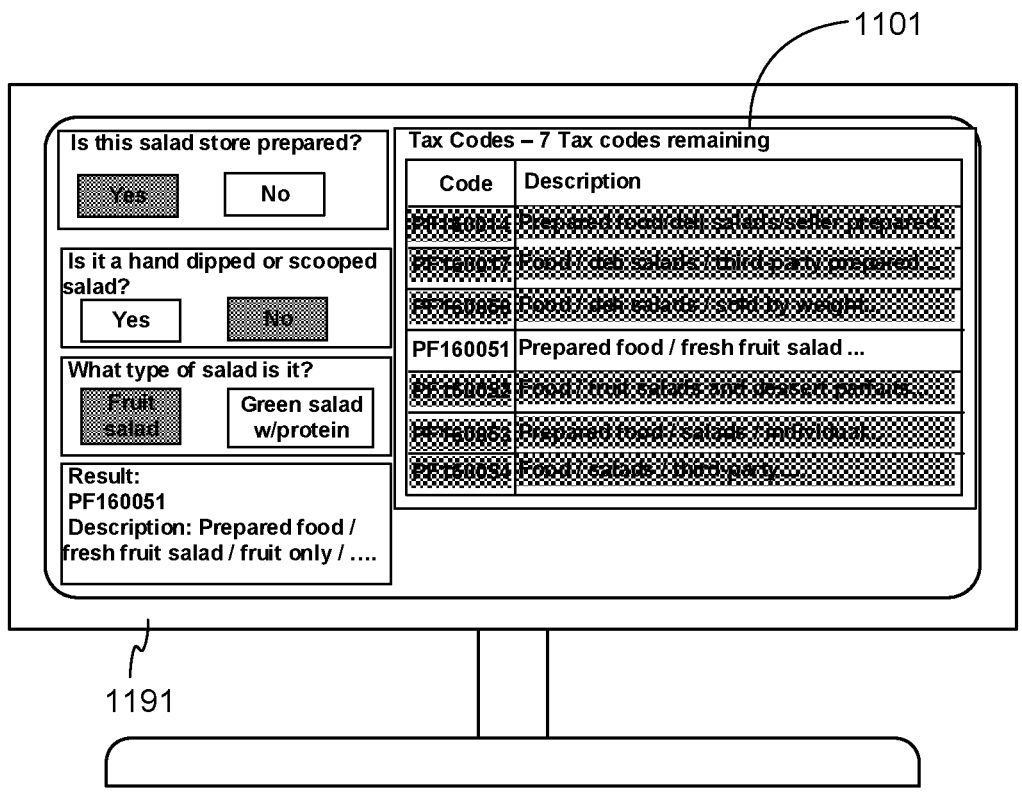
FIG. 11 is a sample view of a UI of a system for assisting searches for item codes corresponding to items that is an improvement in automated computerized systems, according to embodiments of the present disclosure.

FIG. 11 is a sample view of a UI 1101 of a system for assisting searches for item codes corresponding to items that is an improvement in automated computerized systems, according to embodiments of the present disclosure.

The UI 1101 may be displayed by the screen 1191 after an answer for a question presented in another UI, such as UI 1001, is obtained. The screen 1191 presents the UI 1101 which includes the user interface elements indicating the question and answer presented in another UI, and presents additional user interface elements with one or more additional questions and answers to the user. The UI 1101 additionally presents a result user interface element which indicates the tax code which corresponds to the item and an updated table of tax codes similar to the table in UI 1101. The updated table of tax codes in UI 1101 indicates the tax code which is related to the item.

Figure 12:
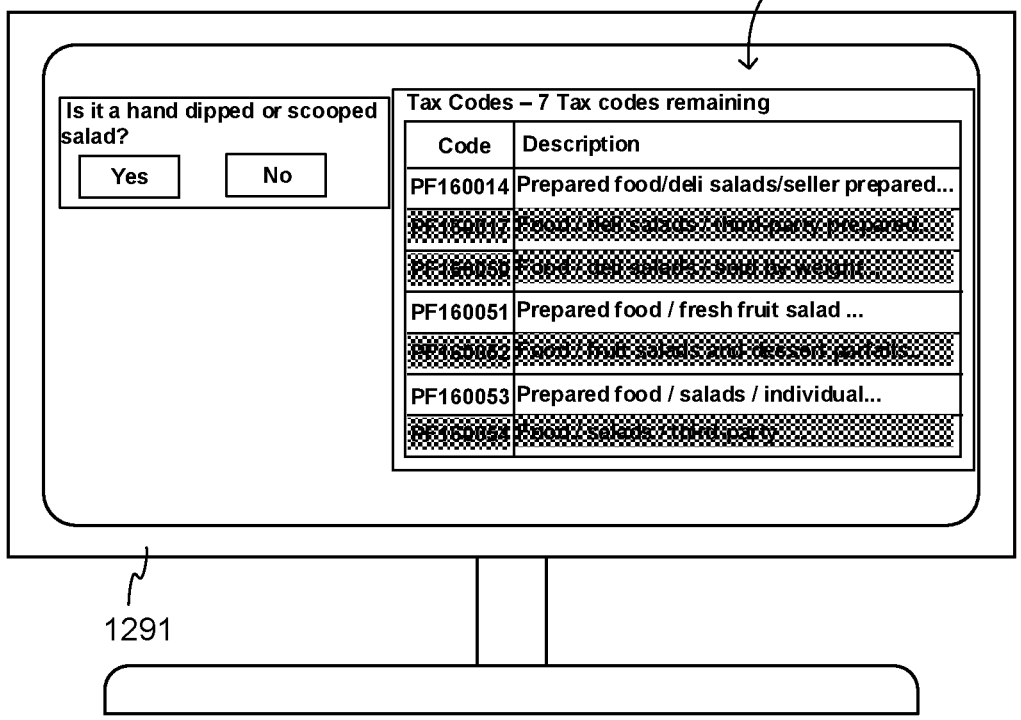
FIG. 12 is a sample view of a UI of a system for assisting searches for item codes corresponding to items that is an improvement in automated computerized systems according to embodiments of the present disclosure.

FIG. 12 is a sample view of a UI 1201 of a system for assisting searches for item codes corresponding to items that is an improvement in automated computerized systems according to embodiments of the present disclosure.

The UI 1201 may be displayed by the screen 1291 when the an OSP 898 or OSP 198 determines, based on the data in the dataset, that certain branches of code decision trees may be skipped. The screen 1291 presents the UI 1201 which includes a user interface element indicating a question and a table of tax codes, of which a portion of the tax codes presented in the table are marked as not corresponding to the item. Thus, an OSP 198 may "skip" branches in the decision trees for determining the tax code corresponding to the item based on the data in the dataset. Additionally, questions corresponding to the skipped branches are not presented to the user. In the example depicted in FIG. 12, the question "is this salad store prepared" is skipped, because the dataset already indicated to the OSP 198 that the salad was store prepared. Likewise, the UI 1201 indicates that the codes for salads that are not store prepared do not correspond to the item indicated by the dataset.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not unnecessarily obscure this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including, for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. With respect to the disclosed embodiments extending beyond the scope of the claims, the disclosed embodiments are to be considered supplementary background information and do not constitute definitions of the claimed invention.

In this document, the phrases "constructed to," "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc., patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

What is claimed is:

1. A system, comprising:
   one or more processors;
   one or more non-transitory computer-readable storage media coupled to the one or more processors, the one or more non-transitory computer-readable storage media having stored thereon instructions which, when executed by the one or more processors, result in operations including at least:
   storing trees, in which each tree includes a root node, in which a root node of one of the trees is not shared with a root node of another one of the trees, branch nodes in which certain ones of the branch nodes of the tree are coupled with the root node of the tree and others of the branch nodes of the tree are coupled with the certain ones of the branch nodes, each tree further including at least one leaf node coupled with at least one of the branch nodes of the tree, in which, for at least one respective tree, at least one node coupled to the respective tree is navigable from at least one node from at least one other tree;
   receiving a dataset for an item;
   extracting one or more parameters from the dataset, each of the one or more parameters comprising at least one item attribute for at least one of the stored trees;
   identifying a first tree in the stored trees, based on the extracted one or more parameters, the first tree having a first root node and first branch nodes;
   remotely causing, via a network, a screen of a remote client computer to present a first user interface (UI), the first UI presenting a selected first branch node that is identified responsive to the item attribute, at least some of the first branch nodes that are coupled with the selected first branch node and at least one of first leaf nodes, in which the first UI presents to a user options for selecting one of the presented first branch nodes;
   receiving, from the user operating the first UI, via the network, a first selection input indicating at least one of the presented first branch nodes;
   remotely causing, via the network and responsive to the first selection input, the screen to present a second UI, the second UI presenting the indicated first branch node, the second UI further presenting at least some of the first branch nodes that are coupled with the selected first branch node and at least one of the first leaf nodes, the second UI further presenting a second branch node of a second tree that has a second root node distinct from the first root node and second leaf nodes, the second branch node being navigable from at least one node of the first tree;
   receiving, from a user operating the second UI, via the network, a second selection input indicating the second branch node; and
   remotely causing, via the network and responsive to the second selection input, the screen to present a third UI, the third UI presenting the indicated second branch node, at least one additional second branch node coupled with the indicated second branch node, and at least one of the second leaf nodes.

2. The system of claim 1, in which:
   at least one second leaf node of the second leaf nodes is additionally coupled with at least one branch node of the first branch nodes.

3. The system of claim 1, in which:
   none of the second leaf nodes are additionally coupled with any branch node of the first branch nodes.

4. The system of claim 1, in which:
   each leaf node includes information describing a code which indicates a group of items.

5. The system of claim 4, in which:
   the third UI presents an assign button for a leaf node; and
   in which the instructions further result in operations including:

determining whether the assign button has been activated by a user; and in response to a determination that the assign button has been activated by a user, assigning the item to the group of items identified by the code included in the leaf node.

6. The system of claim 1, in which the instructions further result in operations including:

remotely causing, via the network, the screen of the remote client computer to present a question to the user; and in which at least one of the first selection input or the second selection input is an answer to the question.

\* \* \* \* \*